United States Patent [19]

Vitzthum et al.

[11] 4,104,409

[45] Aug. 1, 1978

[54] PRODUCTION OF HOP EXTRACTS

[75] Inventors: Otto Vitzthum, Bremen; Peter Hubert, Bremen-Lesum; Wolfgang Sirtl, Bremen, all of Germany

[73] Assignee: Studiengesellschaft Kohle mbH, Mülheim (Ruhr), Germany

[21] Appl. No.: 646,780

[22] Filed: Jan. 6, 1976

Related U.S. Application Data

[63] Continuation of Ser. No. 498,159, Aug. 16, 1974, abandoned, which is a continuation of Ser. No. 258,587, Jun. 1, 1972, abandoned.

[30] Foreign Application Priority Data

Jun. 3, 1971 [DE] Fed. Rep. of Germany ....... 2127618

[51] Int. Cl.² .............................................. A23L 1/00
[52] U.S. Cl. .................................... 426/386; 426/318; 426/319; 426/427; 426/431; 426/651; 426/655; 426/600

[58] Field of Search .............. 426/386, 312, 318, 319, 426/600, 655, 651, 425, 429, 431, 424, 427, 474–475, 489

[56] References Cited

U.S. PATENT DOCUMENTS 3,477,856  11/1969  Schultz ................................ 426/424

FOREIGN PATENT DOCUMENTS 1,057,911  2/1967  United Kingdom .................... 426/312

OTHER PUBLICATIONS

Aleksandrov et al., "Influence of Temperature and Pressure During Liquid Carbonic Acid Extraction", Maslo-Zhirovaja Prom. (1970) 36(5), pp. 21–23.

*Primary Examiner*—R. B. Penland
*Attorney, Agent, or Firm*—Burgess, Dinklage & Sprung

[57] ABSTRACT

Process for extraction of hops utilizing supercritical gases such as carbon dioxide.

40 Claims, 1 Drawing Figure

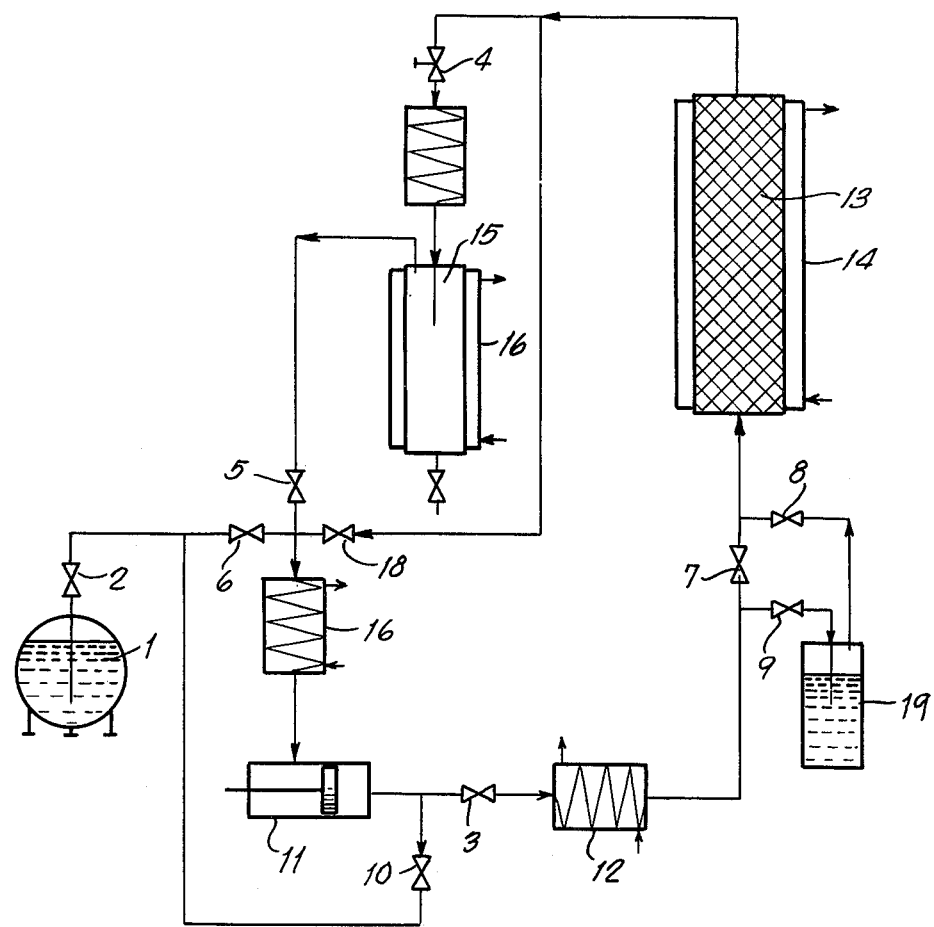

PRODUCTION OF HOP EXTRACTS

This application is a continuation of Ser. No. 498,159, filed Aug. 16, 1974, now abandoned, which is a continuation of Ser. No. 258,587, filed Jun. 1, 1972, now abandoned.

BACKGROUND OF THE INVENTION

It has been customary for many years to use hop extracts instead of natural hops for brewing purposes. The use of extracts has a number of advantages, not only economic, but also with respect to brewing techniques and quality of product.

Several extraction procedures have been developed for extracting the resin portions and essential oils from the natural hop with organic solvents. Halogenated hydrocarbons such as methylene chloride, trichloroethylene and carbon tetrachloride as well as methanol, ethanol, acetone, n-hexane have been used singly and in various mixtures. These procedures extract primarily the essential oils resin portions, both hard and soft together with tannins and other substances; the relative quantities depending upon the polarity of the solvent.

Other procedures utilize mixtures of organic solvents with ammonia and water. Still others extract with water and use the aqueous solutions containing isomerization products for brewing purposes.

Frequently the resin portions are extracted with a first solvent, the spent hops then moistened to expel the first solvent and finally extracted with water. The solvent and water extracts are combined for use in brewing. Often the organic solvent extracts which are free from tannins are used alone in brewing. It has been observed that by this procedure the beers produced have good foam stability, while at the same time having low temperature stability and taste which differ little from beers produced with tannin containing extracts. (H. Schilfarth Mschr. Brauerei, 18, 65–77, 1965).

A persistent difficulty with presently known hop extracts is the removal of solvents from the extracts and from the spent hops. The syrupy or pasty masses which result from the usual extraction procedures release their solvent content only with great difficulty. Additionally, the chemical influence of the extraction solvents on the hop ingredients is not clear in many cases and may lead to the production of toxic components. These problems are very significant because of the requirement for the use of high purity components in brewing.

The invention is concerned with the production of hop extracts of high purity by a procedure which avoids the difficulties of previously known methods and may be utilized to produce tannin free, tannin containing and other specialized hop extracts.

THE INVENTION

A process has now been discovered for the production of hop extracts in which air dried hops are extracted with extraction solvents in the supercritical state with respect to temperature and pressure. Suitable solvents include carbon dioxide, saturated and unsaturated hydrocarbons containing up to about three carbon atoms; preferably those in which at least fifty percent of the hydrogen atoms of the parent hydrocarbon are replaced with halogen; sulfur hexafluoride; nitrous oxide and mixtures of these having a critical temperature of from about 30° to 100° C. The extracts are separated from the solvent gas by reducing the pressure or temperature or both to below the critical points.

Carbon dioxide is the most preferred extraction medium, but others such as $SF_6$, $CHF_3$, $CF_3Cl$, $CF_2=CH_2$, $CHF_2Cl$, $C_3F_8$, $CH_2=CH_2$, $CH_3CH_3$ and $N_2O$ either singly, mixed with each other or with carbon dioxide can be employed. Supercritical $CO_2$ in the sense of this invention is $CO_2$ the temperature of which is above the critical temperature of $CO_2$ (31.3° C), while its pressure is above the critical pressure (about 73 atmospheres). Other supercritical gases used in the invention may be similarly described. Typically, the critical pressure will be at least 70 atmospheres and the temperature at least 30° C.

It is possible to utilize liquid $CO_2$ as a solvent, but its dissolving power is less than that of supercritical $CO_2$. The same holds true for the other extraction media.

For illustrative purposes, the invention will be principally described with reference to the most preferred solvent carbon dioxide. The presently preferred process will be best understood by reference to FIG. 1.

The gas used in the process is stored in tank 1 controlled by valve 2. In carrying out the method of the invention, the entire system is flushed with dry $CO_2$ and valves 3, 4, 5 and 6 are opened. All other valves are closed. Liquid carbon dioxide flows from tank 1 to liquid gas pump 11 and then into heat exchanger 12 where it is brought to supercritical conditions of temperature and pressure. The resulting gas flows through valve 7 which is opened and into pressure pipe 13 which is formed with heat jacket and equipped with filter plates having a filter threshold of five millimicrons to support the hops.

The gas flows through the hops where it performs its extraction function by picking up especially the resin portions and the essential oils to form what might be termed a supercritical solution.

The laden gas expands through throttle valve 4 into tank 15 which is a precipitation tank. It is equipped with jacket 16 for heating or cooling. The pressure in tank 15 is less than the critical pressure while the temperature can be either above or below critical. Separation takes place in this tank. If the temperature in the tank is less than critical, the gas liquifies and resins, essential oils and the extracted water content of the hops precipitates. If the temperature is above the critical temperature the precipitated extract is substantially water free.

If the gas liquifies in tank 15 the gaseous phase is siphoned off through valve 5 into heat exchanger 16 where the temperature is adjusted to liquefy the gas. It is then delivered to liquid pump 11 and the cycle is continued. The total operation time of the system may vary within wide limits depending upon the size of the components of the system, the selected process parameters and the degree of extraction desired. Normally, however, it will vary from about 2 to 10 hours.

Instead of utilizing a liquid pump 11, a compressor may be employed. In that event, the function of the heat exchanger changes since the gas current from tank 15 must be brought to heat exchanger 16 at a temperature above the critical temperature before it enters the compressor. In practice, the heat exchangers are adjusted so as to make the energy consumption as economical as possible.

At the end of the extraction period, the $CO_2$ is returned to tank 1 with the exception of a small amount which is retained in tank 15. Valves 6 and 18 are opened, all others are closed. Care is taken that a certain amount of liquid $CO_2$ remains in tank 15. This is then pumped off in the vapor phase and the temperature of the contents of the tank drops to a maximum of −10° C. The resulting extract is then so solid that it can be removed from the tank without loss using mechanical scrapers. It still contains a small amount of $CO_2$ which evaporates slowly during subsequent storage at about 0° C. The resulting gas serves as an inert atmosphere to protect the air sensitive material.

The entire resin can be extracted quantitatively and the analysis of the $CO_2$ extract shows that it contains practically only the resin component, apart from water. A particular feature of the method is that the alpha acids, which are essential for the bitters, can be removed quantitatively from the hops, the beta-fractions and the hard resins either likewise completely or only partly, differentiations being again here possible between the latter two components. It is thus possible to produce extracts with particularly high alpha-acid contents.

According to one preferred embodiment of the invention, the entire soft resin portion and the essential oils of the hops, but less than 1% of the hard resin portion, can be extracted by working at extraction pressures of 100 to 220 excess at.

According to another preferred embodiment of the invention, the entire alpha-acids and the essential oils but less than 100% of the beta-acids contained in the hops and less than 100% of the hard resin portions, are extracted by working at extraction pressures of 100 − 220 excess at. and separating the extract further by subjecting it to an additional supercritical extraction at pressures of 100 − 150 excess at.

The product obtained according to the invention is a light - to dark green paste whose color depends on the extraction temperature; it is practically free of tannin substances (see analysis) and can be used directly for brewing purposes, unless it is preferred to mix it with the hop components obtained during the aqueous extraction.

The extracted hops are substantially lighter in color than before the treatment, and they are practically odorless. This point is particularly important for the subsequent aqueous extraction of the treated hops, since especially the highly volatile components of the essential oil can no longer be lost during the water extraction and the subsequent vacuum concentration.

The hops liberated of the total resin and of the essential oils can then be extracted in known manner in an aqueous phase without any further preliminary treatment; the solution is concentrated and the residue combined under an inert gas in suitable mixers with the $CO_2$ extract.

In another modification of the method, the hops liberated of the total resin and the essential oils by the treatment with dry, supercritical $CO_2$, cannot be treated directly with water, but first in a second step with wet, supercritical $CO_2$. The wetting of the gas current is effected in tank 19, which is cut into the circuit through valves 8 and 9. There is thus obtained an extract fraction whose constituents have some tannin character. The water extract thus obtained, which is either dry or hydrous, as desired, is then added to the extract obtained in the first step and can then be used either alone or mixed with the extract portion obtained from the strictly aqueous extraction (third step), which can be either spray- or freeze-dried.

As mentioned above, it is necessary to work at supercritical pressures above p-crit. gas, and at temperatures above t-crit. gas. In practice values above 100 excess at. are selected for the pressures, preferably 150-400 excess at. The temperature depends on the thermal load capacity of the material, that is, the temperatures should be as low as possible, for example, from about 32° C to 100° C, preferably from 40° to 50° C.

EXAMPLES 1. 1 kg air-dried Hallertau hops were treated in the plant according to the drawing with dry $CO_2$ under the following conditions:

extraction pressure $p_1$ = 315 excess at. separating pressure $p_2$ = 67 excess at.

extraction temperature $t_1$ = 50° C separating temperature $t_2$ = 25° C.

duration 7 hours total amount of $CO_2$ circulated: 49.6 kg

Result 170 g of a hydrous, olive-green, pasty extract were obtained. The remaining extracted hops were yellow-light green and practically odorless.

The hops liberated of the resin portions were extracted without further preliminary treatment for 3 hours with 10 l water in the waterbath at 90° − 95° C the spent residue was filtered off and the solution concentrated in the vacuum at 40°-50° C bath temperature to a slurry consistency. After freeze-drying there was obtained 209 g of a light brown powder. This mass was then mixed intensively under inert gas at room temperature with the $CO_2$ extract obtained before, which yielded 379 g hop extract. The analysis of the latter is shown in the following table:

Table 1

| determination | hops untreated | extract | hops, after water-extraction |
|---|---|---|---|
| water content % | 9.9 | 13.2 | 5.33 |
| total resin % | 13.9 | 33.2 | 2.1 |
| total soft resin % | 12.6 | 30.8 | 1.4 |
| alpha acids % | 5.2 | 13.8 | <0.1 |
| beta acids % | 7.4 | 17.0 | 1.4 |
| hard resins % | 1.3 | 2.4 | 0.7 |
| tannins % | 4.1 | 3.8 | <0.1 |

2. 1 kg air dried Hallertau hops were treated in the plant with dry $CO_2$ under the following conditions:

extraction pressure $p_1$ = 400 excess at. separating pressure $p_2$ = 60 excess at.

extraction temperature $t_1$ = 45° C separating temperature $t_2$ = 45° C

Result 110 g of a practically water-free, olive-green pasty extract were obtained. The remaining extracted hops were yellow-light green and practically odorless. The analysis is shown in the following table.

Table 2

| determination | hops untreated | extract | hops, after $CO_2$ extraction |
|---|---|---|---|
| water content % | 7.0 | <1 | 6.9 |
| total resins % | 14.5 | 98 | 3.6 |
| total soft resins % | 12.7 | 87 | 1.5 |
| alpha acids % | 4.4 | 33.8 | below detection limit |
| beta acids % | 8.3 | 53.2 | 1.5 |
| degree of extraction of alpha acids % |  |  | 100 |
| hard resins % | 1.8 | 11 | 2.1 |
| degree of extraction of total resins % |  |  | 76 |
| tannins % | 3.55 | <0.1 | 4.2 |

3. 1 kg air-dried Hallertau hops were treated in the plant with $N_2O$ under the following conditions:

extraction pressure $p_1 = 200$ excess at. extra separating pressure $p_2 = 70$ excess at.

extraction temperature $t_1 = 50°$ C extra separating temperature $t_2 = 25°$ C

Result 150 g of a hydrous, olive-green pasty extract were obtained. The remaining extracted hops were yellow-light green and practically odorless. The analysis is shown in the following table.

Table 3

| determination | hops untreated | extract | hops, after $N_2O$ extraction |
|---|---|---|---|
| water content % | 9.9 | 33 | 5.9 |
| total resin % | 13.9 | 66.5 | 2.75 |
| total soft resin % | 12.6 | 64.6 | 1.84 |
| alpha acids % | 5.2 | 28.4 | 0.17 |
| beta acids % | 7.4 | 36.2 | 3.3 |
| hard resins % | 1.3 | 1.9 | 0.9 |
| tannins % | 4.1 | <0.1 | 4.5 |

What is claimed is:

1. A process for the production of hop extract which comprises extracting air dried hops with an extraction solvent gas while maintaining the gas in the supercritical state with respect to temperature and pressure, and separating the hop extract from the solvent gas laden therewith.

2. A process according to claim 1 in which substantially all of the soft resin portion and essential oils of the hops are extracted at an extraction pressure of from 100 to 220 excess atmospheres, and the resulting extraction contains less than 1% by weight of the hard resin portion of the hops.

3. A process according to claim 2 wherein the recovered extract is again extracted at an extraction pressure of from 100 to 150 excess atmospheres to produce an extract containing substantially all of the original alpha-acid and essential oil content of the hops.

4. A process as in claim 1 wherein the extraction gas is carbon dioxide.

5. A process according to claim 1 in which the extraction solvent gas is dry carbon dioxide and resin and essential oils are thereby extracted from the hops in a first extraction step, and the extracted hops are further extracted with wet supercritical carbon dioxide, in a second extraction step whereby tannin is extracted from the hops.

6. A process according to claim 5 wherein the separated extract from the second extraction is mixed with the extract obtained from the first extraction.

7. A process according to claim 1 wherein the hops contain tannins, and including the further step of extracting the hops with water and separating the tannin content of the aqueous extract.

8. A process according to claim 7 wherein the separated tannin content is mixed with the extract obtained from the first extraction.

9. A process according to claim 8, wherein the gas is $CO_2$.

10. A process according to claim 7, wherein the gas is $CO_2$.

11. A process according to claim 1 wherein the temperature during separation is maintained above the critical temperature of the extraction gas and the separated extract is substantially free of water extracted from the hops.

12. A process according to claim 1 wherein the temperature during separation is maintained below the critical temperature of the extraction gas and the separated extract contains water extracted from the hops.

13. A process according to claim 1 wherein the extraction gas is selected from the group consisting of carbon dioxide; saturated and unsaturated hydrocarbons containing up to about three carbon atoms; nitrous oxide; saturated and unsaturated halogenated hydrocarbons containing up to about three carbon atoms; and mixtures of these.

14. A process according to claim 1, said separation being effected by reducing the pressure to below the critical pressure.

15. A process according to claim 1, said separation being effected by reducing the temperature to below the critical temperature.

16. A process according to claim 1, said separation being effected by reducing the pressure to below the critical pressure and the temperature to below the critical temperature.

17. A process according to claim 1, the critical pressure of the gas being at least 70 atmospheres and the critical temperature being at least 30° C.

18. A process according to claim 1, the temperature being not more than about 100° C.

19. A process according to claim 18, the pressure being above 100 excess atmospheres.

20. A process according to claim 19, wherein the gas is $CO_2$.

21. A process according to claim 18, wherein the gas is $CO_2$.

22. A process according to claim 18, the pressure being 150–400 excess atmospheres.

23. A process according to claim 1, the temperature being 32°–100° C.

24. A process according to claim 23, the pressure being above 100 excess atmospheres.

25. A process according to claim 23, the pressure being 150–400 excess atmospheres.

26. A process according to claim 1, the temperature being 40°–50° C.

27. A process according to claim 26, the pressure being above 100 excess atmospheres.

28. A process according to claim 26, the pressure being 150–400 excess atmospheres.

29. A process according to claim 1, the pressure being above 100 excess atmospheres.

30. A process according to claim 29, wherein the gas is $CO_2$.

31. A process according to claim 1, the pressure being 150–400 excess atmospheres.

32. A process according to claim 1, wherein the gas is at least one of $CO_2$, $SF_6$, $CHF_3$, $CF_3Cl$, $CF_2=CH_2$, $CHF_2Cl$, $C_3F_8$, $CH_2=CH_2$, $CH_3-CH_3$ and $N_2O$.

33. A process according to claim 1, wherein the gas is dry $CO_2$.

34. Process according to claim 33, wherein alpha acids are removed substantially quantitatively from the hops.

35. Process according to claim 34 wherein the extract is practically free of tannin substances.

36. Process according to claim 33, wherein the extract is practically free of tannin substances.

37. A process according to claim 1, wherein the gas is $N_2O$.

38. Process according to claim 1, wherein alpha acids are removed substantially quantitatively from the hops.

39. Process according to claim 38, wherein the extract is practically free of tannin substances.

40. Process according to claim 1, wherein the extract is practically free of tannin substances.

* * * * *